Sept. 22, 1959     D. F. THOMAS ET AL     2,905,096
PUMPS
Original Filed Dec. 30, 1955
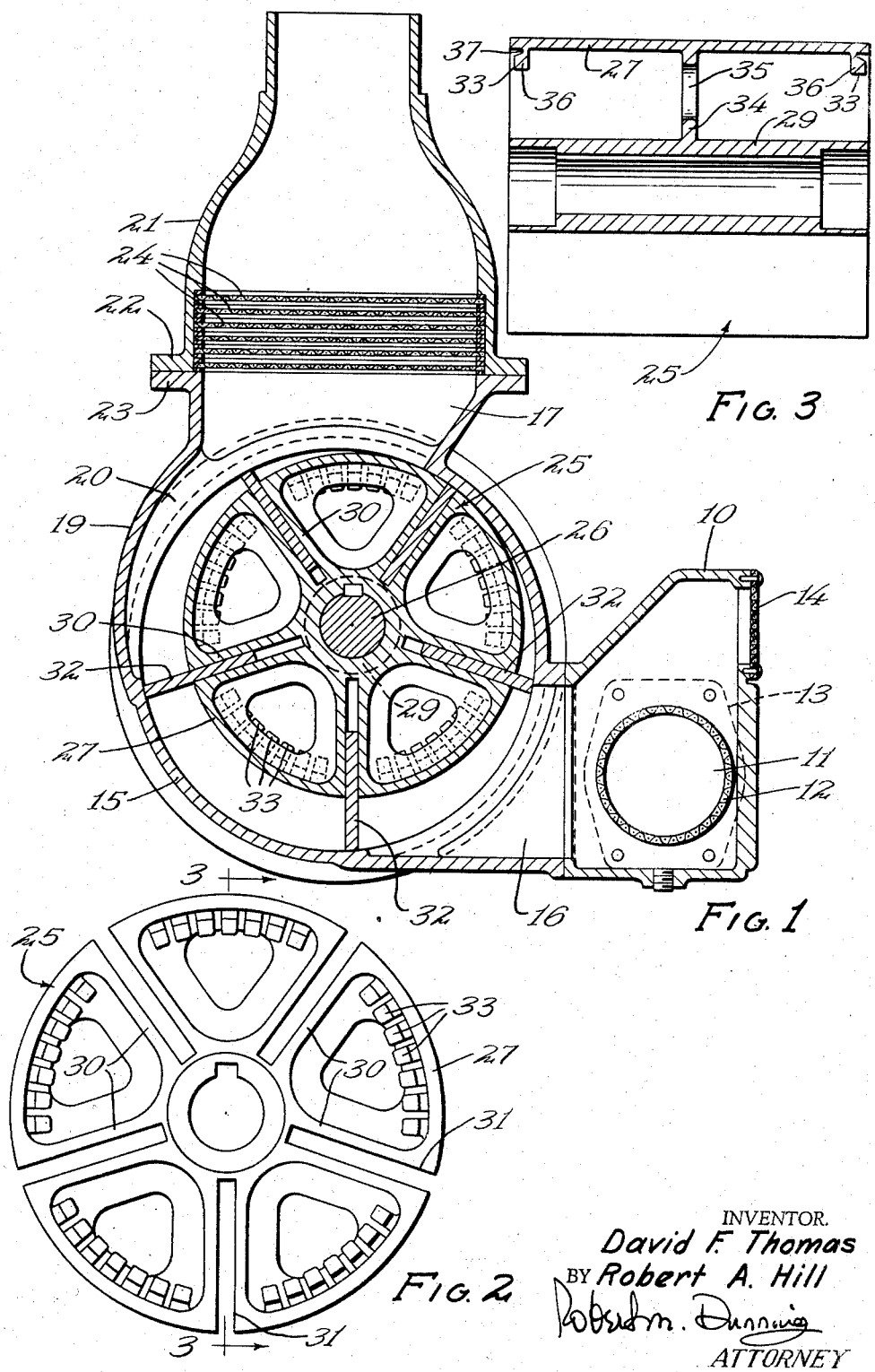
INVENTOR.
David F. Thomas
BY Robert A. Hill
ATTORNEY

United States Patent Office 2,905,096
Patented Sept. 22, 1959

2,905,096

PUMPS

David F. Thomas, St. Paul, and Robert A. Hill, Minneapolis, Minn., assignors to Waterous Company, Ramsey County, Minn., a corporation of Minnesota Original application December 30, 1955, Serial No. 556,718, now Patent No. 2,781,000, dated February 12, 1957. Divided and this application February 8, 1957, Serial No. 638,950

4 Claims. (Cl. 103—136)

This invention relates to an improvement in pumps and deals particularly with a manner of balancing the rotors thereof. While the structure is shown in conjunction with a foam pump, it will be understood that the same idea could be applied equally well to the rotors of pumps of different types.

Difficulty is often experienced in balancing the rotors of pumps and the like. While pumps which travel at a low rate of speed often need not be balanced with great precision, the necessity for providing an accurate balance of the rotors increases as the speed of rotation increases. The rotors are usually made by a casting process and it is a well known fact that castings made from the same patterns often vary materially in weight. After the rotors have been machined, they are usually balanced either by grinding material from the heavy side of the casting or by adding material to lighter portions of the casting. Considerable time is consumed in either grinding or boring sufficient material away to provide a reasonably accurate balance. Time is also consumed in welding or otherwise weighting the lighter side of the rotor and difficulty is also experienced due to the fact that any material added must be applied to the inner surface of the rotor (when the rotors are hollow) and the inner rotor surface is not readily accessible.

An object of the present invention resides in the provision of a rotor having a series of angularly spaced projections attached thereto along a relatively fragile web of connection. Each projection is possessed of substantial weight. One or more rings of such projections may be provided in axially spaced relation. In balancing the rotor, projections on the heavier side of the rotor are broken or chipped off, thus reducing the weight of this portion of the rotor. This operation is continued until sufficient weight has been removed to balance the rotor.

A feature of the present invention lies in the fact that the accuracy of balance which may be obtained depends upon the number of projections provided and the size and weight of each projection. If an extremely accurate balance is required, a larger number of small projections is preferred. However, if the accuracy of balance is not extremely critical, a smaller number of larger projections may be employed. When the rotor is almost in balance, the accuracy may be increased by grinding or boring a relatively small amount of the metal away or by adding a small amount of weight to the lighter side of the casting. By following this procedure the time required for the balancing operation can be very materially reduced. By the provision of two rings of projections, one at or near each end of the rotor, dynamic balancing may be effected by selectively removing projections at either or both ends as necessary.

The present application is a division of our previously filed application for Foam Pump, Serial No. 556,718, now Patent No. 2,781,000, filed December 30, 1955.

In the drawings forming a part of the specification:

Figure 1 is a cross sectional view through a pump showing a typical application of the invention.

Figure 2 is an end elevational view of the rotor used in the pump of Figure 1.

Figure 3 is a cross sectional view through the rotor, the position of the section being indicated by the line 3—3 of Figure 2.

The pump shown in Figure 1 of the drawings is only typical of a type of installation showing an embodiment of the present invention. The pump is shown as having an inlet manifold 10 which is provided with an inlet opening 11 surrounded by a cylindrical screen 12 extending crosswise of the inlet. Fluid may enter the inlet 11 and must pass through the screen 12 to enter the manifold. An adapter flange 13 is shown as secured to the outer surface of the inlet manifold for attaching an inlet pipe to the manifold.

A screen 14 is supported in the inlet manifold 10 above the level of the inlet 11. Air may enter the screen 14. As a result, in the particular arrangement illustrated air and liquid are mixed by operation of the pump rotor.

A rotor housing 15 is connected to the inlet manifold 10 by a passage 16. The housing 15 is generally cylindrical in form and includes an outlet 17 which is in angular relation to the inlet 16. A portion 19 of the housing adjoining the outlet passage 17 angles away from the rotor and ribs 20 bridge the portion 19 as well as the outlet opening 17 so as to guide the vanes of the pump in a manner which will be later described.

An outlet manifold 21 is provided with an attachment flange 22 which attaches to the flange 23 encircling the outlet 17. The outlet manifold 21 contains a series of spaced screens 24 through which the mixed air and liquid must pass on leaving the pump so as to fairly intermix the liquid and air to produce a foam.

A rotor 25 is mounted upon a supporting shaft 26 extending through the ends of the rotor casing 15. The shaft 26 is mounted eccentrically with respect to the center of the housing 15 as is clearly indicated in Figure 1. The rotor 25 includes an outer cylindrical shell 27 and a concentric hub 29, the shell and hub being connected by radially extending ribs 30. Each rib is radially slotted from the outer surface or outer shell 27 as indicated at 31. Thus the rotor comprises an outer cylindrical shell, an inner hub, radially extending spokes, and radially extending grooves in the spokes designed to accommodate radially slidable vanes 32.

The rotor 25 is in close proximity to the inner surface of the housing 15 at a point between the inlet 16 and the outlet 17 and the rotor operates in a clockwise direction as viewed in Figure 1. Accordingly, the vanes 32 sliding along the inner surface of the outer casing 15 act to force fluid from the inlet 16 to the outlet 17. Thus, a mixture of air and fluid are forced to the outlet and through the screens 24 to the outlet manifold 21.

In the particular arrangement illustrated in the drawings, a series of angularly spaced inwardly projecting teeth 33 or lugs are provided on the inner surface of the outer shell 27 of a rotor 25 at each end of the rotor. This arrangement is provided as in such a structure the teeth or lugs are readily accessible between the various spokes 30. A web 34 extends from the hub 29 to the outer rim 27 and is provided with apertures 35 therethrough between the various spokes 30 so as to permit fluid to pass through the rotor in the event any fluid enters the rotor and to prevent the rotor from being urged in one direction or the other by fluid under pressure which may enter the hollow rotor.

The teeth 33 or lugs are best formed as illustrated in Figures 2 and 3 of the drawings. It will be noted that each tooth includes an enlarged inner portion or enlarged inner extremity 36 which is connected to the outer shell 27 by a relatively thin web 37 providing a relatively small area of connection. This web 37 is of sufficient thickness to hold the various teeth 33 in their proper location under normal operating conditions. However, the webs 37 are sufficiently thin to permit the various teeth 33 to be broken away from the outer shell 27 of the rotor without causing any injury to the rotor itself. If desired, additional rows of teeth or lugs such as 33 may be provided in axially spaced relation to those illustrated at opposite ends of the rotor.

When it is desired to balance the rotor, the rotor is mounted upon its shaft 26 or upon a similar shaft and the rotor is either placed in a dynamic and static balancing apparatus which is well known in the art or else the shaft is placed in suitable free running bearings and allowed to rotate to a stop so that the heaviest part of the rotor will be lowermost. Thereafter, the heaviest part of the rotor is lightened by breaking off one or more of the teeth 33. These teeth or projections are heavy enough to cause a material difference in the balance of the rotor. If the rotor is only slightly out of balance, the removal of one such tooth 33 may be sufficient to substantially balance the rotor. In any event, the rotor may be approximately balanced by the removal of a desired number of such lugs or projections 33 from the heaviest part of the rotor. If a finer or more accurate balance is required, this may be accomplished by grinding away portions of adjoining teeth or adding a slight amount of weight to the lighter side of the rotor. In any event, any material difference in weight on opposite sides of the rotor may be approximately balanced by the removal of certain of the teeth or projections 33 thus greatly reducing the time necessary to balance the rotor. Stated otherwise, the rotor may be balanced to a point where the weight on one side of the rotor differs from the weight on the opposite side thereof by less than the weight of one of the projections 33. Furthermore, by properly spacing the teeth removed from the heaviest side of the rotor, and by removing teeth on opposite sides of the heaviest point of the rotor, even a more accurate balance may be obtained. By selectively removing teeth from rings at both ends of the rotor, dynamic balancing may be accomplished if desired.

In accordance with the patent statutes, we have described the principles of construction and operation of our Improvement in Pumps, and while we have endeavored to set forth the best embodiments thereof, we desire to have it understood that changes may be made within the scope of the following claims without departing from the spirit of our invention.

We claim:

1. A readily balanced rotor for use in a vane pump including a rotor housing having an inlet and an outlet, said rotor including a rotor body rotatably supported in said housing, radially slidable vanes supported by said rotor body, a series of angularly spaced lugs on said rotor body and a thin web between said lugs and said rotor body whereby said rotor may be balanced by removal of certain of said lugs.

2. A readily balanced rotor for use in combination with rotary pump including a housing, said rotor including a rotor body rotatably supported within said housing, a series of angularly spaced projections on said rotor body, said projections being connected to said rotor body by a relatively thin web, whereby selected projections may be removed for balancing the rotor body.

3. A readily balanced rotor for use in combination with rotary pump including a housing, said rotor including a rotor body rotatably supported within said housing, a series of angularly spaced projections on said rotor body, each said projection comprising a relatively large extremity, and a relatively small area of connection between said extremity and said rotor body, said area of connection being fracturable to permit removal of selected projections for the purpose of balancing the rotor body.

4. The structure of claim 3 and in which the projections are arranged in axially spaced rows.

References Cited in the file of this patent

UNITED STATES PATENTS

| 1,160,000 | Schmitt | Nov. 9, 1915 |
| 2,741,992 | Glazebrook | Apr. 17, 1956 |

FOREIGN PATENTS

| 445,892 | Germany | June 20, 1957 |